No. 843,257. PATENTED FEB. 5, 1907.
H. F. BRUSSOW.
PLOW.
APPLICATION FILED JUNE 11, 1906.

Witnesses:
C. C. Holly.
J. Townsend.

Inventor,
Herman F. Brussow.
by James R. Townsend
his atty.

UNITED STATES PATENT OFFICE.

HERMAN F. BRUSSOW, OF WHITTIER, CALIFORNIA.

PLOW.

No. 843,257.  Specification of Letters Patent.  Patented Feb. 5, 1907.

Application filed June 11, 1906. Serial No. 321,147.

*To all whom it may concern:*

Be it known that I, HERMAN F. BRUSSOW, a citizen of the United States, residing at Whittier, in the county of Los Angeles and State of California, have invented a new and useful Plow, of which the following is a specification.

This invention relates to improvements in plows, and has particular reference to attachments for disk plows used in the cultivation and tilling of orchards.

One of the objects of this invention is to provide a plow which will till the soil and pulverize the earth around the trunks of fruit-bearing trees without injuring the same and without shaking down the fruit from the trees or injuring the depending branches, which in a great many instances are in contact with the earth.

In plows hitherto employed, and especially disk plows, the disks were so arranged that it was practically impossible for them to destroy the weeds and other vegetation growing around the trunks of fruit-trees, and all attempts to do so were met with a destruction of the extending branches as well as the shaking down of the unripe fruit from the trees. Either the horses were compelled to force their way through the branches or to encircle the fruit-trees, in which event the plow itself would contact with the branches and injure the same without tilling the soil nearest the trunk or destroying the weeds thereabout, which, especially in fruit-orchards, is a necessary condition for the proper propagation of the trees.

The present invention has been designed to overcome these obstacles, as well as to increase the facility for cultivating the soil in and about the trunks of the trees without injuring the branches and without causing the horses to ruin the trees by forcing their way therethrough in order to pulverize the soil beneath.

The invention comprises, broadly, a means attachable on the ordinary plow whereby the disk members are brought in close proximity to the trunk of any tree irrespective of the dependency of its branches and at the same time are kept in as low a position as possible.

With these and other objects in view this invention consists in the features, details of construction, and combination of parts as will be described in connection with the accompanying drawings and then be more particularly pointed out in the claims.

Figure 1:
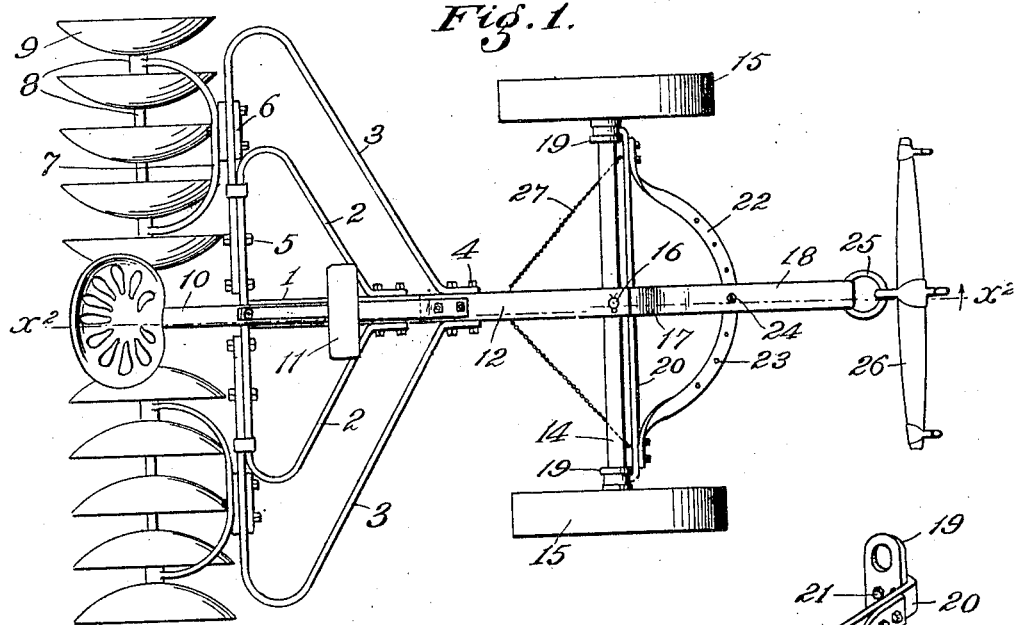
Figure 3:
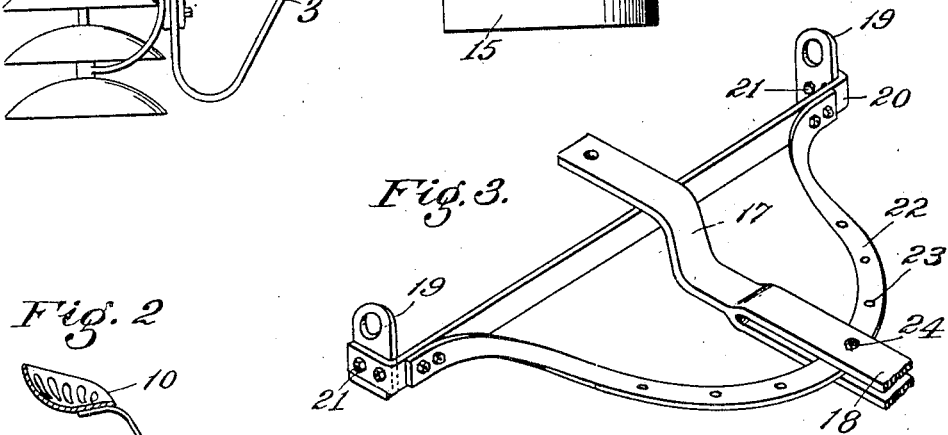
Figure 2:
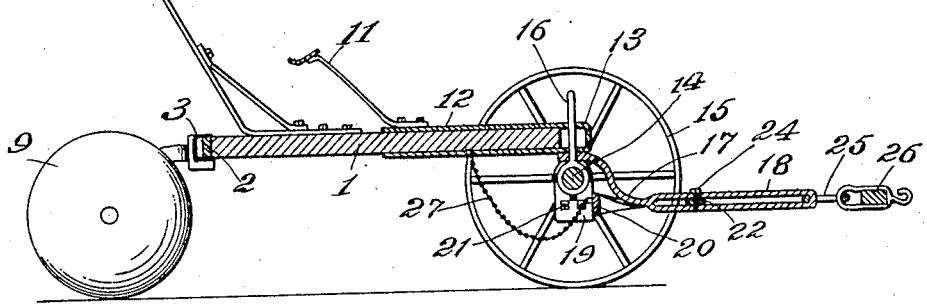

In the drawings, Figure 1 represents a top plan view; Fig. 2, a vertical longitudinal section, and Fig. 3, a perspective view of a detached part of my invention.

Specific reference being had to the drawings, 1 represents a beam, having attached thereto outwardly-extending members 2. A further outwardly and rearwardly extending member 3 is bolted onto said beam 1, as shown at 4, and extends to the rear of the beam 1, where it is secured to the members 2 by bolts 5 or in any other suitable manner. Mounted upon this frame 3, composed of the outwardly and rearwardly extending members, is a clamp 6, carrying a frame 7, which is secured to a shaft 8, onto which a plurality of disks 9 are journaled. Clamp 6 is adjustable with respect to the frame or members 3 and may be moved beyond the extremity thereof in opposite directions, as may be required. The ordinary seat 10 is provided and mounted on said beam 1 and fastened thereto by bolts, and a resilient member 11, arranged to accommodate the feet of the operator of the machine, is mounted in a position whereby it may be reached by the operator of the plow. A substantially U-shaped member 12 is arranged to fit the extremity of said beam 1 and extend away therefrom, as shown at 13. 14 indicates a shaft having journaled thereon wheels 15. A king-bolt 16 is loosely mounted upon said shaft 14 and extends through a plurality of openings provided in the U-shaped member 12. The king-bolt 16, extending through the forward portion of the beam and being mounted on the axle 14, admits of the removal of the king-bolt, together with the beam and tongue, from said shaft 14 when renewal of these parts becomes necessary. A tongue 17, terminating in a bifurcation 18, extends forwardly of said shaft and has an opening in the rear portion thereof for the purpose of accommodating the king-bolt 16.

19 represents a plurality of hangers arranged on the opposite ends of the shaft 14 and having secured thereto a cross-bar 20, held in place by bolts 21. A circular yoke 22 is bolted onto said bar 20 and extends forwardly of said bar 20 and between the furcated portion 18 of the tongue 17. Said yoke 22 is provided with a plurality of openings 23, which are arranged to accommodate the bolt 24, extending through the furcated portion 18, and in this manner to secure the yoke and tongue together. It will be seen that this tongue is adjustable with respect to said yoke by means of said bolt or pin 24, whereby the disks are thrown away from a plane parallel with that of the shaft 14, and thereby throw said disks far beyond the width of the wheels and at an angle thereto. A clevis or ring 25 is loosely secured in the forward portion of said furcated member 18 and is adapted to carry a whiffletree 26.

It is of course understood that swingletrees and doubletrees are equally applicable to this invention, and either two horses or three horses may be attached to the device.

From the above description of the invention it is plain to be seen that the outwardly and rearwardly extending members 3 are capable of effectively plowing and tilling the soil adjacent the trunks of fruit-trees without injury to the limbs and branches extending away therefrom and without any liability of shaking the fruit from the trees. By making the tongue adjustable with respect to said yoke 22 the position of the members 3 and the disks carried thereby may be changed to throw the same at an angle to the travel of the device. The hangers 19 are loosely mounted on the journal or shaft 14.

One of the main features accomplished by this invention is the dispensation with a draft-tongue which heretofore was carried by the horses. This tongue invariably bruised the shoulders of the horses whenever a turn of the vehicle was desired, and, furthermore, the disk plow provided with a tongue was incapable of properly effecting the destruction of the weeds, grass, and other vegetation growing about the trunks of trees, and for that reason their use has generally been abolished by those engaged in the raising of fruit.

This attachment may be applied to any kind of plow at the present day in use, or it may be used separately and independently of any prior device, as may be desired by the operator.

In order to prevent the wheels from contacting with the outwardly extending members 3, a chain 27 is provided, which is fastened to the bar 20 and insures a limited movement of the shaft and wheels journaled thereon.

Having thus fully described my invention, what I claim, and desire to secure by Letters Patent of the United States, is—

1. The combination with an axle and a pair of wheels journaled thereon, of a beam, means for securing said beam to said axle, a pair of frames mounted on said beam, one inside the other, a plurality of disk members carried by one of said frames, said disk members being adjustably mounted, and means for causing a variance in the position of the frames with respect to said axle.

2. A cultivator comprising an axle and a pair of wheels journaled thereon, a beam, means for securing said beam to said axle, a frame carried by said beam and extending beyond the width of the wheels on said axle, a plurality of disk members carried by said frame, a slotted tongue mounted on said axle, a king-bolt for securing said frame and tongue, and means for angularly positioning said tongue whereby the disk members are thrown out of parallel alinement with the axle.

3. A plow comprising an axle, a pair of wheels journaled thereon, a beam, a king-bolt for securing said beam to said axle, a member encircling the sides of said beam and having an opening; a frame extending beyond the width of the wheels, a plurality of disks carried by said frame, means for shifting said disks, and means for varying the angularity of said frame with respect to said axle.

4. A plow comprising an axle having a pair of wheels journaled thereon, a beam carrying a disk-supporting frame, means for mounting said beam on said axle, a tongue having a furcated portion, a plurality of hangers loosely supported by said axle, a connection between said hangers and a yoke carried by said hangers and extending through the furcated portion of said tongue, and means for adjusting said tongue relative to said beam.

5. The combination with an axle and a pair of wheels journaled thereon, of a beam having disk-carrying frame mounted thereon, a king-bolt for pivotally connecting said beam to said axle, a tongue having an elongated slot, an arc in said slot, a support for said arc, and means for adjusting said tongue in the radius of said arc for causing said disks to travel out of parallel alinement with said axle.

6. The combination with a pair of wheels and an axle, of a beam, a frame mounted on said beam extending rearwardly thereof and beyond the width of said wheels, a plurality of disk members adjustably secured to said frame, a king-bolt mounted on said axle and arranged to pivotally secure said beam to said axle, a furcated tongue extending forwardly of said axle and held in place by said king-bolt, a plurality of hangers carried by said axle, a connection between said hangers, a yoke carried by said connection and extending through said furcated tongue, means for adjusting said tongue on said yoke whereby to cause an angular travel of said disks relatively to said axle, and means for limiting the movement of said axle.

7. The combination with an axle and a pair of wheels journaled thereon, of a beam, and a slotted tongue mounted on said axle, a king-bolt for pivotally securing said beam and tongue to said axle, a hanger carried by said axle, an arc on said hanger extending in the slot of said tongues, said tongue being laterally adjustable on said arc, a pair of frames secured to said beam, one inside the other, and a plurality of disk members carried by one of said frames.

In testimony whereof I have hereunto set my hand at Los Angeles, California, this 2d day of June, 1906.

HERMAN F. BRUSSOW.

In presence of—
ANTON GLOETZNER,
JULIA TOWNSEND.